United States Patent
Versey

[11] 4,319,801
[45] Mar. 16, 1982

[54] IMAGE RECORDING SYSTEM

[76] Inventor: Peter F. Versey, 66 Campbell Rd., Twickenham, England

[21] Appl. No.: 57,686

[22] Filed: Jul. 16, 1979

[51] Int. Cl.³ .................. G02B 27/00; G03B 15/08
[52] U.S. Cl. ............................. 350/19; 350/54; 352/47; 352/53
[58] Field of Search ............. 350/19, 54, 43, 45; 352/46, 47, 53

[56] References Cited
U.S. PATENT DOCUMENTS
3,935,011  1/1976  Schindl .................. 350/19 X Primary Examiner—John K. Corbin
Assistant Examiner—Matthew W. Koren
Attorney, Agent, or Firm—Emory L. Groff, Jr.

[57] ABSTRACT

A method and apparatus for recording visual images, for example on a cinematograph or video film. A first lens system is used to produce a real image of a subject against a neutral background, and a conventional recording camera is then used to record the real image through a zoom lens. The latter can pan and tilt relative to the first lens system.

11 Claims, 1 Drawing Figure

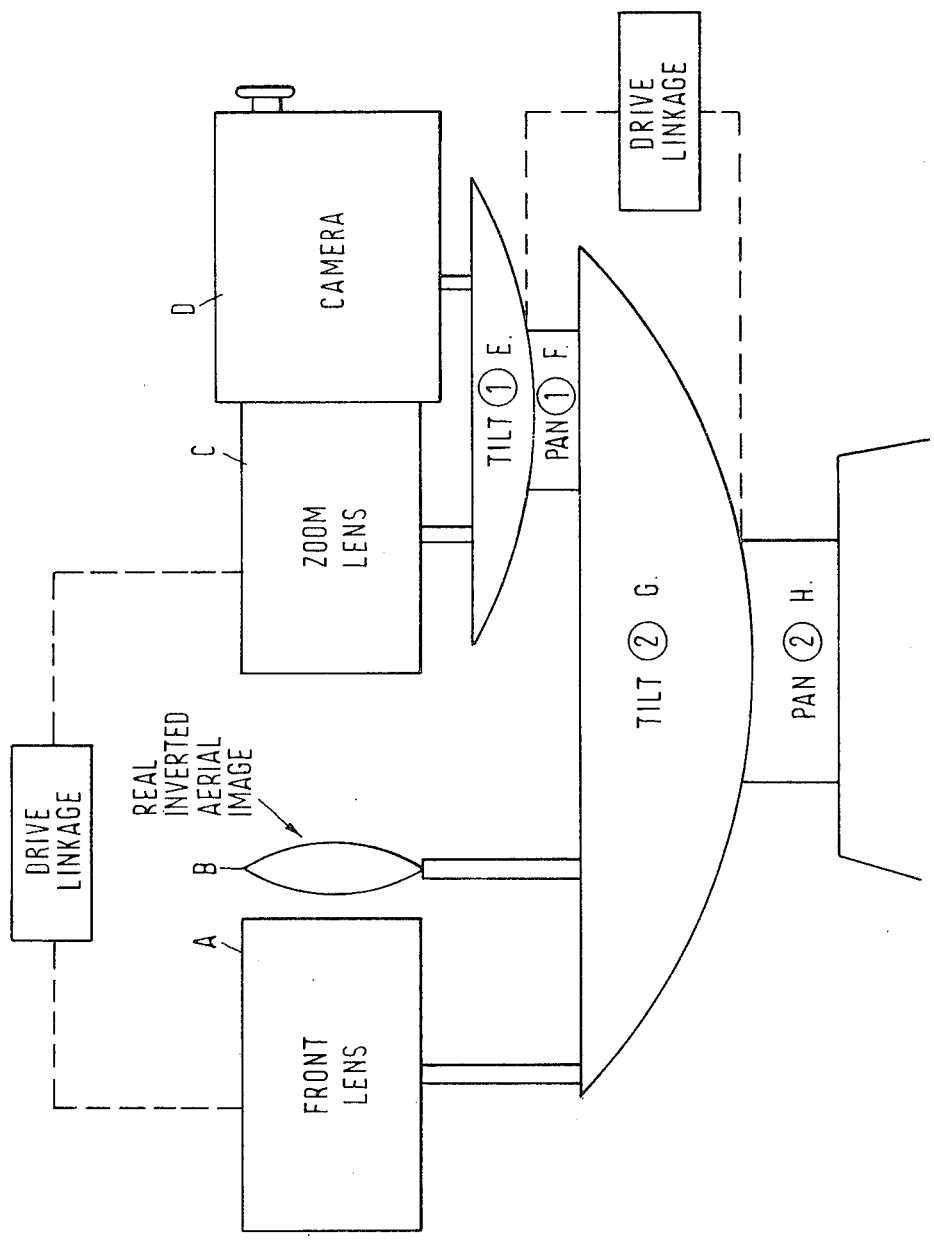

IMAGE RECORDING SYSTEM

This invention relates to a method of recording visual images, for example on a cinematograph or video film.

It is often required to produce images of people or things which can be easily varied in size, and/or moved at will about the film frame, and this is particularly required where a character or thing are to appear as if "floating" e.g., in space.

Up to now, it has been a considerable problem to achieve this visual effect, particularly to achieve a considerable reduction in size. Normally, it has been necessary to photograph the subject, to develop the film, and then to produce a second negative by optical reduction means. This has clearly been an expensive and time-consuming procedure.

The invention proposes a method and apparatus for overcoming such problems, and for facilitating the production of such images. According to the invention, there is provided a method of recording visual images comprising using a first lens system to produce a first image, using a second lens system to produce a second image, adjusting the position of the second image within a frame by movement of the second lens system relative to the first, and recording the second image. Further according to the invention there is provided a visual image recording system comprising a first pan-and-tilt head, a first lens system on said first head, a second pan-and-tilt head mounted on the first, a second lens system mounted on the second head, and a camera for recording the image produced by the second lens system. In practical terms, the first lens system is used to produce a real image of a subject against a neutral background, and a conventional recording camera is then used to record the real image through a zoom lens.

The invention will be clearly understood from a description of the method and apparatus in relation to the accompanying drawing, which shows a schematic side view of the apparatus required.

A first pan-and-tilt head, G,H support a front lens A. The latter may be primary or spherical or anamorphic and is preferably a zoom lens. The image produced by this lens is an aerial real inverted image of a subject against a neutral, e.g. black or white background. Preferably, a lens B is included for pupil correction. If desired, an image righting device e.g. a prism or mirror system may be inserted after the first lens system and before the lens B.

Instead of this image being registered on photographic or video film, as would be conventional, the image is used as the subject for a second stage image production, carried out by a T.V. or film camera D having a zoom lens C. The latter are mounted on a second pan and tilt head E,F. The resultant recorded image is very considerably reduced, and its direct production avoids the previously troublesome methods involving development and later reduction.

The first pan-and-tilt heads allow the entire apparatus to be adjusted relative to the real subject being photographed, and the second allows movement of the second image within the frame being photographed.

It has been found that the light loss using this system requires an increased exposure of only about 1 stop.

In order to obtain best advantage from this system, there are preferably functional linkages between the two tilts, the two pans, and the two main lenses if both are zooms. The reason for this is that it is necessary to produce a smooth change both of position in the film frame, and of magnification, regardless of which of the pan and tilt heads, or which of the lenses, is being adjusted. The linkages may be mechanical or separate electrical drives, and are indicated functionally in the drawing.

It will be understood that the above description of the present invention is susceptible to various modification changes and adaptations.

What is claimed is:

1. A method of recording visual images of a three-dimensional subject against a background, comprising using a first lens system to produce a first image of the subject, using a second lens system to produce a second image from the first image, adjusting the position of the second image by movement of the second lens system relative to the first lens system, and recording the second image only.

2. A method as claimed in claim 1, wherein a uniform background is used for the subject to be recorded so that the subject as recorded appears to float against the background.

3. A method as claimed in claim 1 wherein movement of the second lens system is accompanied by adjustment of the first lens system.

4. A method as claimed in claim 1, the second lens system being mounted on a pan-and-tilt head.

5. A visual image recording system comprising a first pan-and-tilt head, a first lens system on the first head, the first lens system producing a first image, a second pan-and-tilt head mounted on the first head, a second lens system mounted on the second head and arranged to produce a second image from the first image, and means for recording the second image.

6. An image recording system as in claim 5, wherein said first lens systems is a zoom lens.

7. An image recording system as in claim 5 or 6, wherein said second lens system is a zoom lens.

8. An image recording system as claim 5, wherein an image inversion system is positioned behind the first lens system.

9. An image recording system as in claim 5, wherein a pupil correction lens is positioned behind the first lens system.

10. An image recording system as in claim 5, wherein an operational linkage exists between the first and second pan-and-tilt heads.

11. An image recording system as in claim 10, wherein an operational linkage exists between the first and second lens systems.

* * * * *